US012107364B2

(12) United States Patent
Ito et al.

(10) Patent No.: US 12,107,364 B2
(45) Date of Patent: Oct. 1, 2024

(54) CONNECTOR AND CONNECTOR-EQUIPPED ELECTRIC WIRE

(71) Applicant: Yazaki Corporation, Tokyo (JP)

(72) Inventors: Yuto Ito, Tochigi (JP); Keisuke Sasaki, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 365 days.

(21) Appl. No.: 17/835,554

(22) Filed: Jun. 8, 2022

(65) Prior Publication Data

US 2022/0399679 A1 Dec. 15, 2022

(30) Foreign Application Priority Data

Jun. 14, 2021 (JP) ................................ 2021-098524

(51) Int. Cl.
*H01R 13/52* (2006.01)

(52) U.S. Cl.
CPC ..... *H01R 13/5221* (2013.01); *H01R 13/5213* (2013.01); *H01R 13/5227* (2013.01)

(58) Field of Classification Search
CPC ............ H01R 13/5221; H01R 13/5213; H01R 13/5227; H01R 11/12; H01R 31/005; H01R 13/5205; H01R 13/521
USPC .......................................................... 439/587
See application file for complete search history.

(56) References Cited

U.S. PATENT DOCUMENTS

| | | | | |
|---|---|---|---|---|
| 8,624,114 | B2 * | 1/2014 | Oga | B60R 16/0215 174/72 A |
| 9,412,491 | B2 * | 8/2016 | Inao | H01B 7/0045 |
| 9,742,166 | B2 * | 8/2017 | Inao | H02G 3/04 |
| 9,818,504 | B2 * | 11/2017 | Maeda | H01B 7/0045 |
| 10,227,052 | B2 * | 3/2019 | Nakagawa | F16L 11/11 |
| 10,243,335 | B2 * | 3/2019 | Yabashi | H02G 3/0468 |
| 10,427,627 | B2 * | 10/2019 | Fukazu | H02G 3/0406 |
| 10,777,933 | B2 * | 9/2020 | Hayashi | H01R 13/52 |
| 10,868,415 | B2 * | 12/2020 | Ito | H02G 15/013 |
| 2002/0117319 | A1 * | 8/2002 | Saito | H01R 13/5205 174/650 |

(Continued)

FOREIGN PATENT DOCUMENTS

| | | |
|---|---|---|
| JP | 09-35807 A | 2/1997 |
| JP | 09-45425 A | 2/1997 |

(Continued)

*Primary Examiner* — Alexander Gilman
(74) *Attorney, Agent, or Firm* — Sughrue Mion, PLLC

(57) ABSTRACT

A connector includes: a terminal fitting connected to an electric wire; a housing including a housing chamber, an electric wire drawing port, a communication hole, and a counterpart fitting chamber where a gap formed between the counterpart fitting chamber and a counterpart terminal fitting is filled with a first sealing member; a lid member; a second sealing member that fills a gap between these and forms a first sealed space part in the housing with the first sealing member; a waterproof member including one end part in close contact with an end part of the housing, the other end part in close contact with the electric wire drawn from the electric wire drawing port, and a tubular part, the tubular part including a second sealed space part communicating with the first sealed space part through the electric wire drawing port; and a ventilation component.

10 Claims, 7 Drawing Sheets

(56) References Cited

U.S. PATENT DOCUMENTS

| | | | | |
|---|---|---|---|---|
| 2015/0101842 | A1* | 4/2015 | Han | H02G 15/013 174/50.57 |
| 2019/0135204 | A1* | 5/2019 | Oohira | H02G 3/06 |
| 2019/0267782 | A1* | 8/2019 | Kushima | H02G 15/013 |
| 2019/0379151 | A1* | 12/2019 | Hayashi | H01R 13/5219 |
| 2019/0386423 | A1* | 12/2019 | Miyazawa | H01R 13/5202 |
| 2022/0399678 | A1* | 12/2022 | Ito | H01R 13/5208 |
| 2022/0399679 | A1* | 12/2022 | Ito | H01R 13/5213 |

FOREIGN PATENT DOCUMENTS

| | | | |
|---|---|---|---|
| JP | 2009-193823 | A | 8/2009 |
| JP | 2013-241143 | A | 12/2013 |
| JP | 2014-164825 | A | 9/2014 |
| JP | 2016-201319 | A | 12/2016 |
| JP | 2018-121442 | A | 8/2018 |
| JP | 2019-110096 | A | 7/2019 |

* cited by examiner

CONNECTOR AND CONNECTOR-EQUIPPED ELECTRIC WIRE

CROSS-REFERENCE TO RELATED APPLICATION(S)

The present application claims priority to and incorporates by reference the entire contents of Japanese Patent Application No. 2021-098524 filed in Japan on Jun. 14, 2021.

BACKGROUND OF THE INVENTION

1. Field of the Invention

The present invention relates to a connector and a connector-equipped electric wire.

2. Description of the Related Art

One of the conventionally known connectors is a waterproof connector that suppresses the entry of water into a housing where a terminal fitting is housed. This connector is provided with a waterproof function to maintain the liquid tightness and air tightness in the housing. Therefore, in this connector, the internal pressure of the housing changes under a certain condition. For example, Japanese Patent Application Laid-open No. H9-35807, Japanese Patent Application Laid-open No. 2014-164825, Japanese Patent Application Laid-open No. 2009-193823, Japanese Patent Application Laid-open No. H9-45425, Japanese Patent Application Laid-open No. 2016-201319, Japanese Patent Application Laid-open No. 2019-110096, Japanese Patent Application Laid-open No. 2018-121442, and Japanese Patent Application Laid-open No. 2013-241143 disclose various techniques for this type of waterproof connector in view of the change in the internal pressure of the housing.

For example, an end of an electric wire is physically and electrically connected to a terminal fitting of a connector, and then the electric wire is drawn to the outside through an electric wire drawing port of the housing, thereby forming a connector-equipped electric wire. This type of connector includes a waterproof member in order to suppress the entry of water through the electric wire drawing port. One end of the waterproof member is placed on an outer peripheral surface of an end part of the housing on the electric wire drawing port side in a close contact state and the other end of the waterproof member is placed on an outer peripheral side of the electric wire that is drawn through the electric wire drawing port in a close contact state, so that the electric wire drawing port is covered (for example, Japanese Patent Application Laid-open No. H9-35807). This conventional waterproof member is molded from an elastic material such as rubber, and is attached closely to the housing or the electric wire so that a space is not formed on the inside.

Incidentally, in order not to form the space inside the waterproof member in the connector, it is necessary to mold the shape of the inner peripheral surface of the waterproof member so as to exactly match the outer shape of the housing or the electric wire, or to make the shape of the inner peripheral surface of the waterproof member smaller than the outer shape of the housing or the electric wire. For these reasons, the connector requires higher precision in molding the waterproof member or sacrifices in the workability in assembling the waterproof member, which may lead to higher costs. Therefore, as a practical matter, it is desirable that this connector has a space inside the waterproof member. However, since the waterproof member is more flexible than the housing with high rigidity, the space inside makes it easier to cause the shape change under the influence of the change of the internal pressure of the housing. In the connector, as the shape of the waterproof member changes, a gap may be formed between the waterproof member and the housing, or an excessive load may be applied to the waterproof member.

SUMMARY OF THE INVENTION

In view of this, it is an object of the present invention to provide a connector and a connector-equipped electric wire that can improve the waterproof property.

In order to achieve the above mentioned object, a connector according to one aspect of the present invention includes a terminal fitting physically and electrically connected to an end of an electric wire; a housing including a housing chamber for housing the terminal fitting and the end of the electric wire connected to the terminal fitting, an electric wire drawing port through which the electric wire is drawn to outside of the housing chamber, a communication hole through which the housing chamber communicates with the outside of the housing chamber, and a counterpart fitting chamber into which a counterpart terminal fitting to be physically and electrically connected to the terminal fitting in the housing chamber is inserted and fitted and a gap formed between the counterpart fitting chamber and an outer peripheral surface of the counterpart terminal fitting is filled with a first sealing member; a lid member that covers the communication hole; a second sealing member that fills a gap between the lid member and the communication hole and forms a first sealed space part in the housing with the first sealing member; a waterproof member being elastically deformable and including one end part with an inner peripheral surface in close contact with an outer peripheral surface of an end part of the housing on the electric wire drawing port side, an other end part with an inner peripheral surface in close contact with an outer peripheral side of the electric wire drawn from the electric wire drawing port, and a tubular part connecting between the one end part and the other end part, the tubular part including a second sealed space part communicating with the first sealed space part through the electric wire drawing port; and a ventilation component that is assembled to the lid member, enables passage of gas between the first sealed space part and the outside of the housing, and disables passage of liquid between the first sealed space part and the outside of the housing.

In order to achieve the above mentioned object, a connector-equipped electric wire according to another aspect of the present invention includes an electric wire; and a connector attached to an end of the electric wire, the connector including a terminal fitting physically and electrically connected to the end of the electric wire, a housing including a housing chamber for housing the terminal fitting and the end of the electric wire connected to the terminal fitting, an electric wire drawing port through which the electric wire is drawn to outside of the housing chamber, a communication hole through which the housing chamber communicates with the outside of the housing chamber, and a counterpart fitting chamber into which a counterpart terminal fitting to be physically and electrically connected to the terminal fitting in the housing chamber is inserted and fitted and a gap formed between the counterpart fitting chamber and an outer peripheral surface of the counterpart terminal fitting is filled with a first sealing member, a lid member that covers the communication hole, a second sealing member that fills a gap between the lid member and the communication hole and forms a first sealed space part in the housing with the first sealing member, a waterproof member being elastically deformable and including one end part with an inner peripheral surface in close contact with an outer peripheral surface of an end part of the housing on the electric wire drawing port side, an other end part with an inner peripheral surface in close contact with an outer peripheral side of the electric wire drawn from the electric wire drawing port, and a tubular part connecting between the one end part and the other end part, the tubular part including a second sealed space part communicating with the first sealed space part through the electric wire drawing port, and a ventilation component that is assembled to the lid member, enables passage of gas between the first sealed space part and the outside of the housing, and disables passage of liquid between the first sealed space part and the outside of the housing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a connector and a connector-equipped electric wire according to the present invention is hereinafter described in detail with reference to the drawings. The present invention is not limited by this embodiment.

Embodiment

One embodiment of the connector and the connector-equipped electric wire according to the present invention is described with reference to FIG. 1 to FIG. 9.

Figure 1:
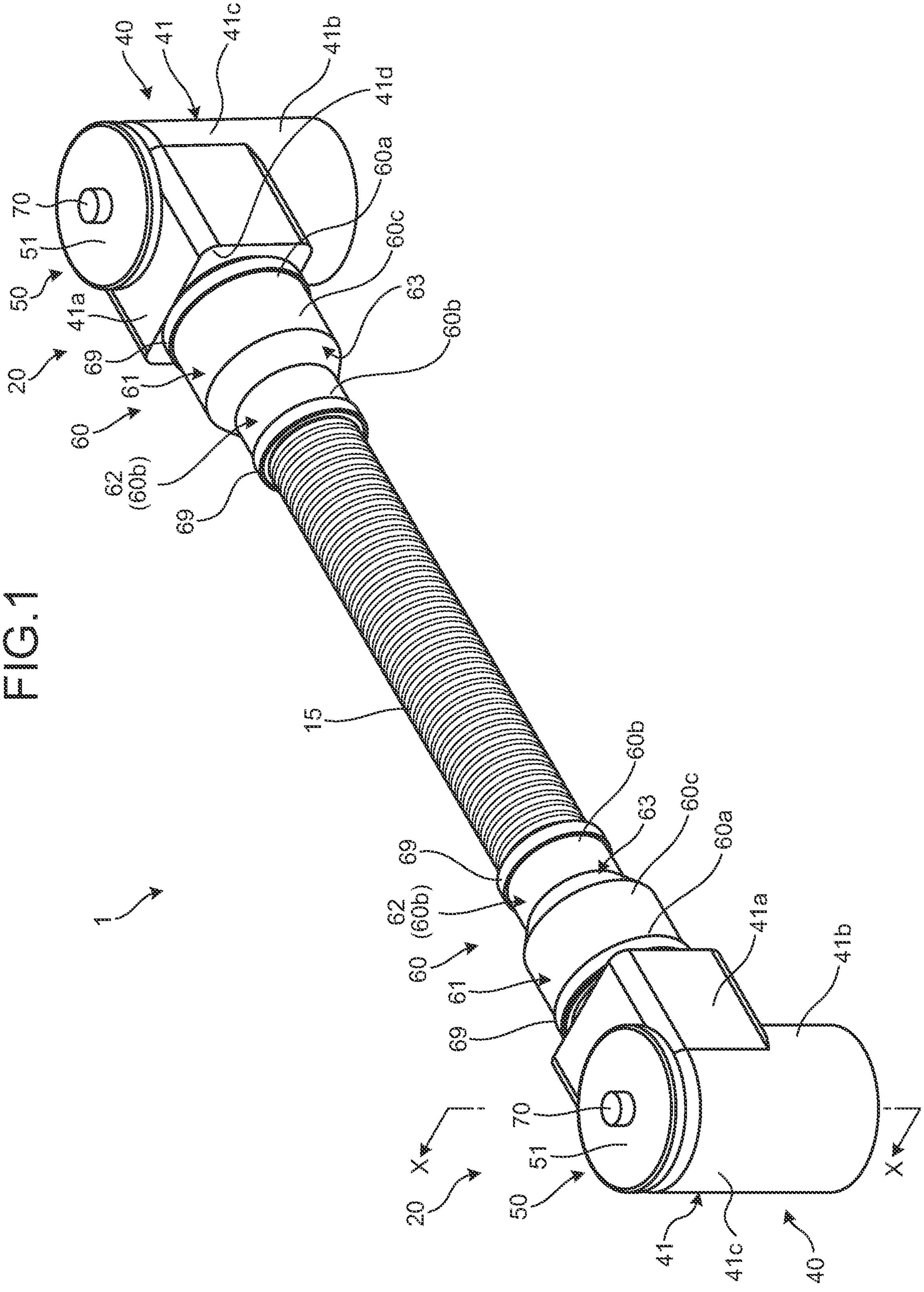
FIG. 1 is a perspective diagram illustrating a connector and a connector-equipped electric wire according to an embodiment.
Figure 2:
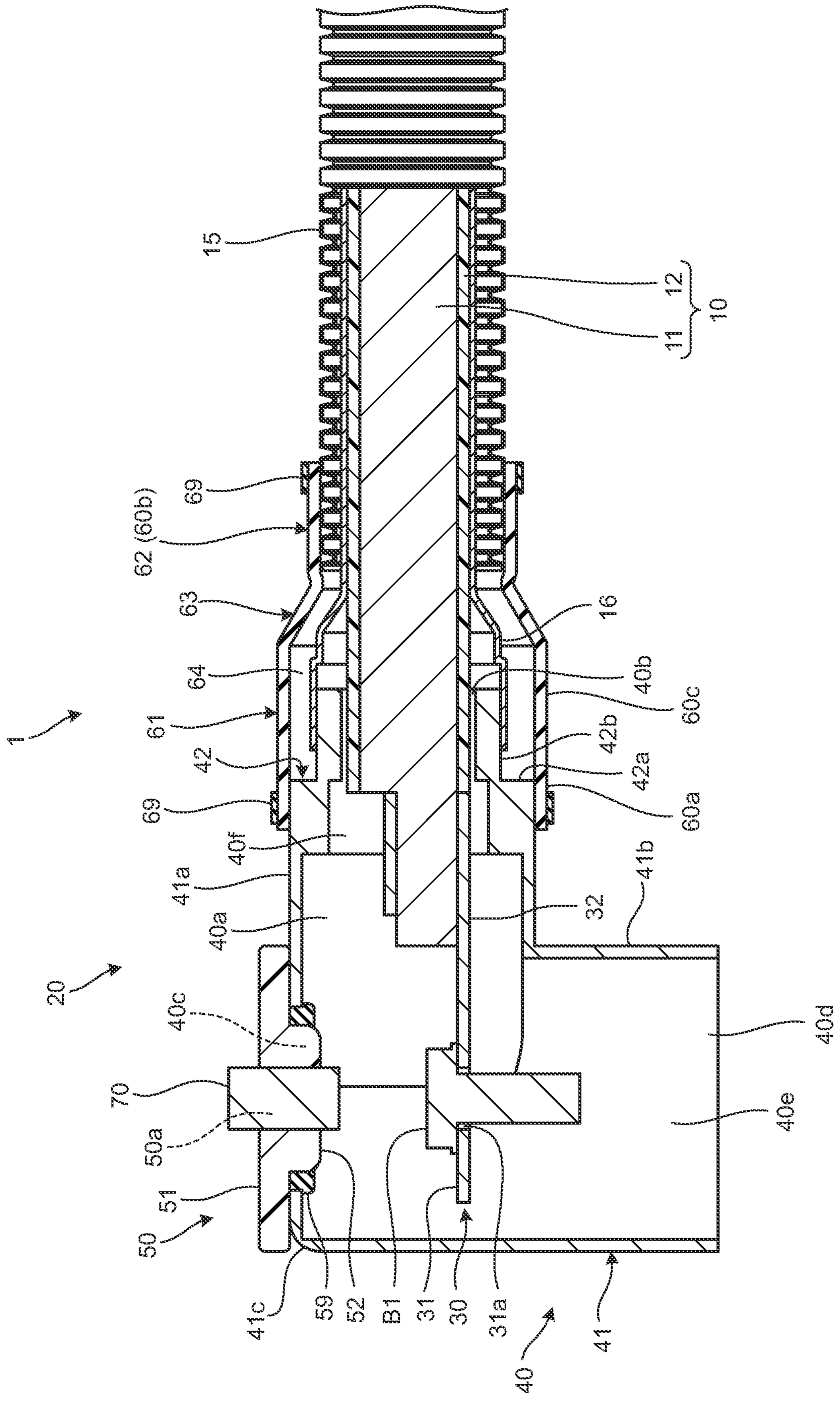
FIG. 2 is a diagram illustrating one connector side of a section taken along line X-X in FIG. 1.
Figure 3:
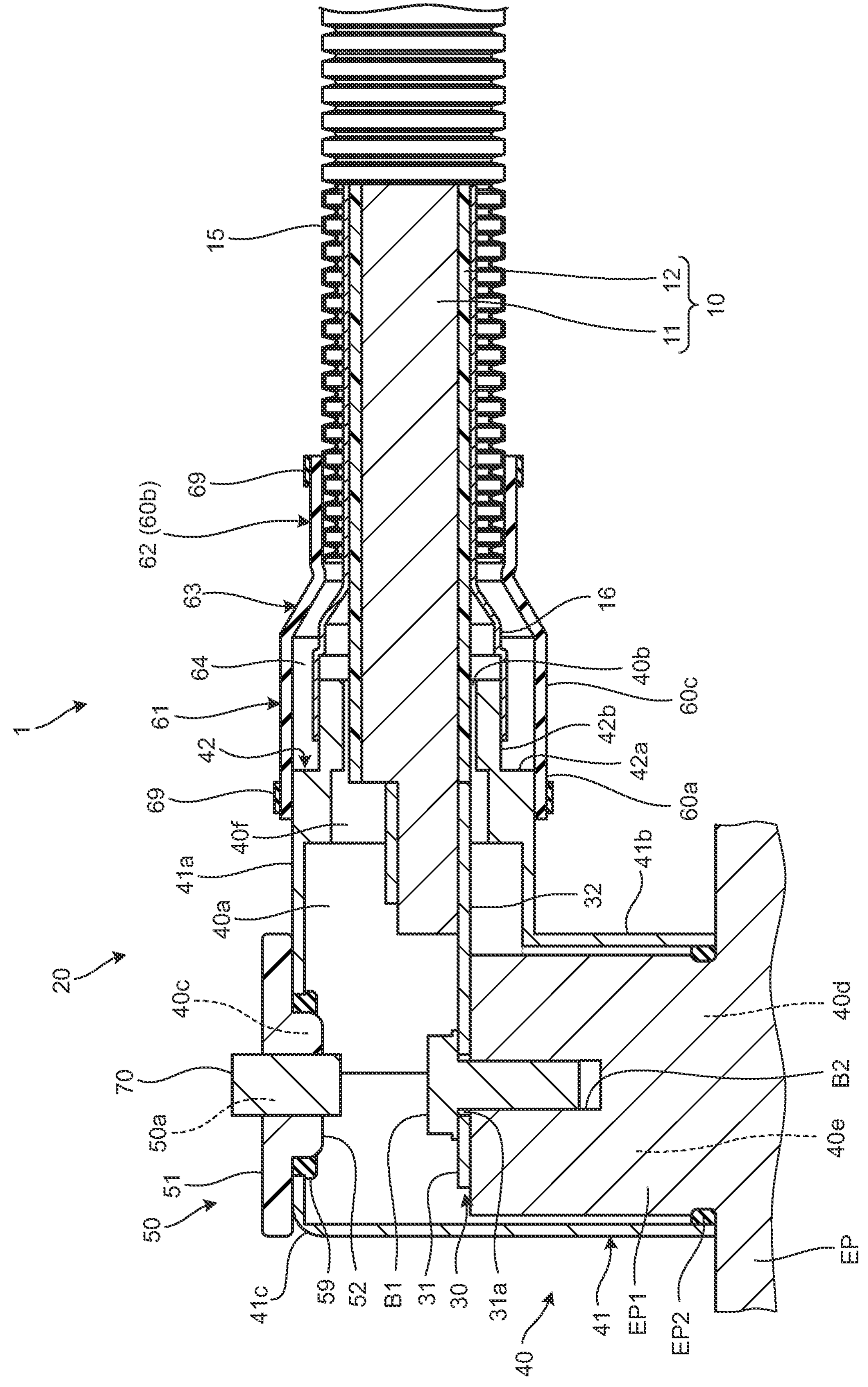
FIG. 3 is a diagram illustrating the one connector side of the section taken along line X-X in FIG. 1 together with a counterpart terminal fitting.
Figure 4:
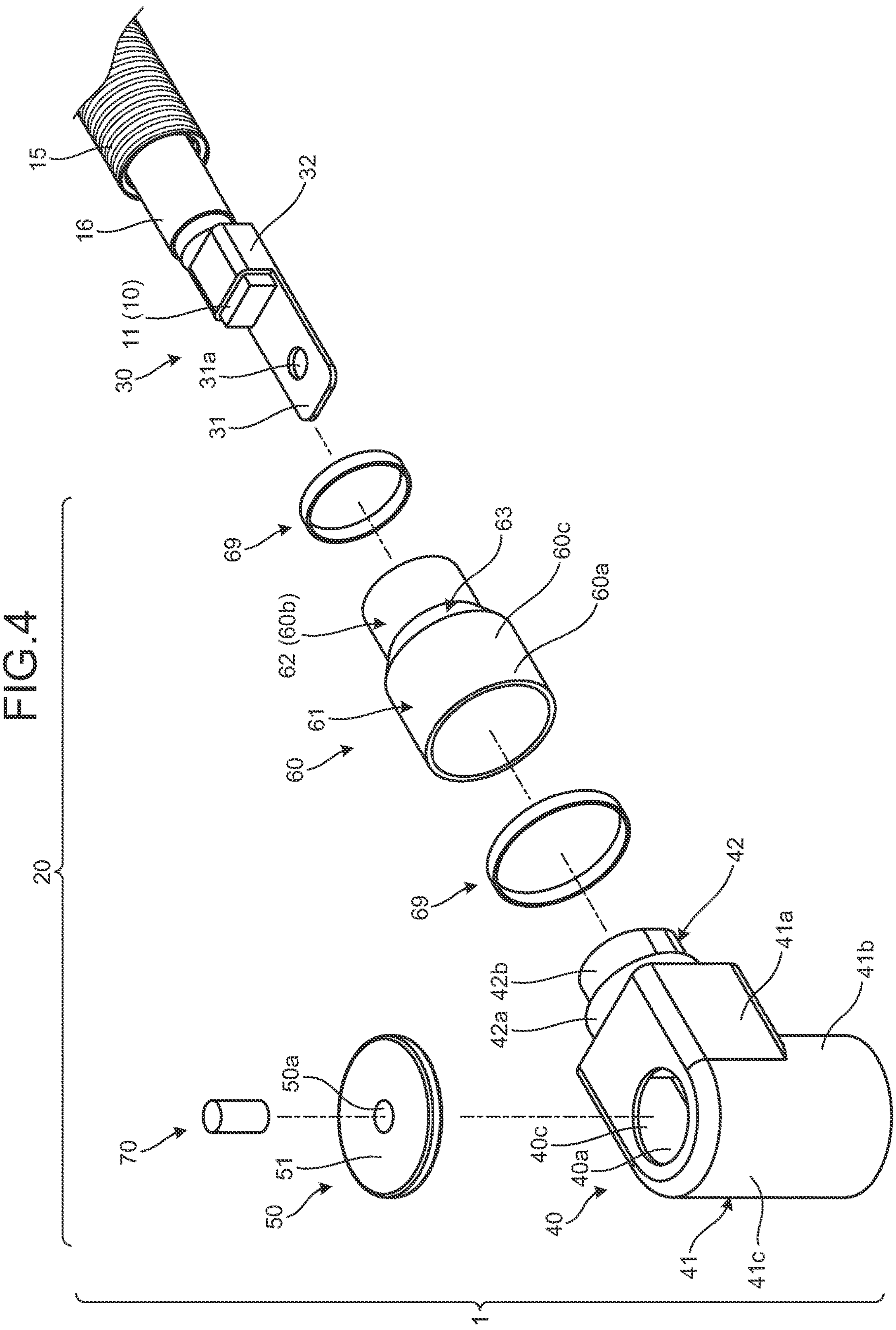
FIG. 4 is an exploded perspective diagram illustrating the one connector side in the connector-equipped electric wire according to the embodiment.

In FIG. 1 to FIG. 4, the connector-equipped electric wire according to the present embodiment is denoted by reference sign 1. This connector-equipped electric wire 1 includes an electric wire 10, and a connector 20 attached to an end of this electric wire 10 (FIG. 2 to FIG. 4).

The connector-equipped electric wire 1 described here includes one connector 20 at one end of the electric wire 10 and one connector 20 at the other end thereof (FIG. 1 and FIG. 4). Furthermore, the connector-equipped electric wire 1 described here includes an exterior member 15 that covers the electric wire 10 between the two connectors 20 (FIG. 1 to FIG. 4).

The electric wire 10 includes a core wire 11, which is a conductor, and a cover 12 that covers the core wire 11 (FIG. 2 and FIG. 3). A section of the electric wire 10 described here that is orthogonal to the axial direction of the electric wire 10 is circular. Therefore, in this electric wire 10, the core wire 11 with a cylindrical columnar shape is covered concentrically with the cover 12 with a cylindrical tubular shape.

Each connector 20 includes a terminal fitting 30 and a housing 40 (FIG. 2 to FIG. 4). In this connector 20, the terminal fitting 30 physically and electrically connected to the end of the electric wire 10 is housed in the housing 40, and the electric wire 10 is drawn from the housing 40 to the outside.

The terminal fitting 30 is molded from a conductive material such as metal. For example, the terminal fitting 30 described here includes a terminal connection part 31 with a rectangular flat-plate shape, and an electric wire connection part 32 that is physically and electrically connected to the core wire 11 at the end of the electric wire 10 (FIG. 2 to FIG. 4). This terminal fitting 30 is physically and electrically connected to a counterpart terminal fitting EP1 included in a counterpart device EP (FIG. 3). The terminal fitting 30 described here is screwed and fixed to the counterpart terminal fitting EP1. For example, here, a circular through-hole 31*a* is formed as a bolt insertion hole in the terminal connection part 31, and a male screw member B1 inserted into the through-hole 31*a* is screwed into a female screw part B2 of the counterpart terminal fitting EP1, so that the terminal connection part 31 is screwed and fixed to the counterpart terminal fitting EP1 (FIG. 2 and FIG. 3). For example, the electric wire connection part 32 is caulked and crimped to the core wire 11 at the end of the electric wire 10.

The housing 40 is molded from an insulating material such as synthetic resin, or a conductive material such as metal.

The housing 40 includes a housing chamber 40*a* in which the terminal fitting 30 and the end of the electric wire 10 connected to the terminal fitting 30 are housed (FIG. 2 to FIG. 4). Furthermore, this housing 40 includes an electric wire drawing port 40*b* through which the electric wire 10 is drawn out of the housing chamber 40*a* (FIG. 2 and FIG. 3). Furthermore, the housing 40 includes a communication hole 40*c* that makes the housing chamber 40*a* communicate with the outside of the housing chamber 40*a* (FIG. 2 to FIG. 4). In addition, this housing 40 includes a counterpart fitting chamber 40*e* that communicates with the housing chamber 40*a* and into which the counterpart terminal fitting EP1 is inserted and fitted through a terminal insertion port 40*d* (FIG. 2 and FIG. 3). In the housing 40 described here, the direction in which the electric wire 10 is drawn (hereinafter referred to as "electric wire drawing direction") intersects with (specifically, is orthogonal to) the direction in which the counterpart terminal fitting EP1 is inserted and fitted.

The housing 40 includes a housing main body 41 the inner space of which is used as the housing chamber 40*a* and the counterpart fitting chamber 40*e*, and an end part 42 on the electric wire drawing port 40*b* side that protrudes from the housing main body 41 in the direction in which the electric wire 10 is drawn (hereinafter this end part is referred to as "electric wire drawing part") (FIG. 2 to FIG. 4).

The housing main body 41 is formed in the shape of two tubular bodies intersecting with (specifically, orthogonal to) each other. The housing main body 41 described here includes a first tubular body 41*a* with a rectangular tubular shape, and a second tubular body 41*b* with a cylindrical tubular shape having a tube axis orthogonal to the tube axis of the first tubular body 41*a*. The housing main body 41 has an L-like shape including an intersection part 41*c* where an end part of the first tubular body 41*a* and an end part of the second tubular body 41*b* intersect with each other (FIG. 1 to FIG. 4). In this housing main body 41, the inner space continues from an opening at one end part of the first tubular body 41*a* to an opening at one end part of the second tubular body 41*b*. For example, in this housing main body 41, from the opening at one end part of the first tubular body 41*a* to the inside of the intersection part 41*c*, the inner space is formed keeping the rectangular opening shape, and from the opening at one end part of the second tubular body 41*b* to the inside of the intersection part 41*c*, the inner space is formed keeping the circular opening shape.

In addition, in the housing main body 41 described here, each of the first tubular body 41*a* and the second tubular body 41*b* includes a protruding part protruding from the intersection part 41*c*. End parts of the respective protruding parts in the protruding direction (that is, one end part of the first tubular body 41*a* and one end part of the second tubular body 41*b*) and the other end part of the second tubular body 41*b* in the intersection part 41*c*, that is, only three parts are opened.

The electric wire drawing part 42 protrudes from the periphery of the opening at one end part of the first tubular body 41*a*. The housing main body 41 described here includes a wall part 41*d* (FIG. 1) that connects a square ring shaped end at one end part of the rectangular tubular shape of the first tubular body 41*a* to the outer peripheral surface of the electric wire drawing part 42, and this wall part 41*d* includes an opening that matches the outer peripheral shape of the electric wire drawing part 42. Here, the opening has a circular shape. In this housing main body 41, the respective inner spaces at the protruding part of the first tubular body 41*a* and the intersection part 41*c* are used as the housing chamber 40*a*. In this housing main body 41, the terminal connection part 31 is placed in the inner space of the intersection part 41*c* so that the second tubular body 41*b* and the through-hole 31*a* are substantially concentric.

In the second tubular body 41*b*, the inward circular opening of the ring-shaped end at one end part of the cylindrical tubular shape is used as the terminal insertion port 40*d*. In this second tubular body 41*b*, the cylindrical columnar space inside the protruding part is used as the counterpart fitting chamber 40*e*. The counterpart fitting chamber 40*e* is a chamber into which the counterpart terminal fitting EP1 to be physically and electrically connected to the terminal connection part 31 of the terminal fitting 30 in the housing chamber 40*a* is inserted and fitted, and the counterpart terminal fitting EP1 with a cylindrical columnar shape inserted and fitted through the terminal insertion port 40*d* is placed concentrically with the female screw part B2. In the housing main body 41, a flat plane of the terminal connection part 31 in the housing chamber 40*a* and an end surface of the counterpart terminal fitting EP1 in the counterpart fitting chamber 40*e* are in surface contact with each other, and the through-hole 31*a* of the terminal connection part 31 and the female screw part B2 of the counterpart terminal fitting EP1 are arranged substantially concentrically.

Furthermore, since there is a gap between the inner peripheral surface of the counterpart fitting chamber 40*e* and the outer peripheral surface of the counterpart terminal fitting EP1, the gap is filled with a first sealing member EP2 to suppress the entry of liquid (such as water) from the terminal insertion port 40*d* (FIG. 3). Here, since an annular (specifically ring-shaped) gap is formed between the inner peripheral surface of the counterpart fitting chamber 40*e* and the outer peripheral surface of the counterpart terminal fitting EP1, this annular gap is filled with the annular (specifically ring-shaped) first sealing member EP2. In this example, an O-ring as the first sealing member EP2 is pre-assembled to an outer peripheral wall of the counterpart terminal fitting EP1, and by inserting and fitting the counterpart terminal fitting EP1 together with the first sealing member EP2 into the counterpart fitting chamber 40*e*, the first sealing member EP2 is placed in the annular gap between the inner peripheral surface of the counterpart fitting chamber 40*e* and the outer peripheral surface of the counterpart terminal fitting EP1.

The intersection part 41*c* includes a circular opening that is smaller in diameter than the ring-shaped end at the other end part of the cylindrical tubular shape of the second tubular body 41*b* and concentric with that end. In this housing main body 41, the opening is used as the communication hole 40*c*. In the connector 20 described here, the communication hole 40*c* is used as an opening for work when the terminal fitting 30 is screwed and fixed to the counterpart terminal fitting EP1. In other words, in this connector 20, the male screw member B1 is inserted from the communication hole 40*c* into the housing chamber 40*a* in the intersection part 41*c* together with a tool socket (not illustrated), and the male screw member B1 is inserted into the through-hole 31*a* of the terminal connection part 31, and further screwed into the female screw part B2 of the counterpart terminal fitting EP1.

The connector 20 includes a lid member 50 that covers the communication hole 40*c* (FIG. 1 to FIG. 4). This lid member 50 includes a lid main body 51 with a disc shape, and a fitting part 52 to be fitted into the communication hole 40*c*. The fitting part 52 is a disc-shaped part with a smaller diameter than that of the lid main body 51, bulging out from the lid main body 51 on the same axis (FIG. 2 and FIG. 3). The connector 20 includes a second sealing member 59 that fills the gap between this lid member 50 and the communication hole 40*c* to suppress the entry of liquid (such as water) through that communication hole 40*c*. Here, since an annular (specifically ring-shaped) gap is formed between an inner wall surface of the periphery of the communication hole 40*c* and an outer peripheral surface of the fitting part 52, this annular gap is filled with the annular (specifically ring-shaped) second sealing member 59. In this example, an O-ring as the second sealing member 59 is pre-assembled to an outer peripheral wall of the fitting part 52, and by fitting this fitting part 52 together with the second sealing member 59 into the communication hole 40*c*, the second sealing member 59 is placed in the annular gap between the inner wall surface of the periphery of the communication hole 40*c* and the outer peripheral surface of the fitting part 52.

The electric wire drawing part 42 described here includes a first electric wire drawing part 42*a* with a cylindrical tubular shape protruding coaxially from a peripheral part of the opening of the wall part 41*d* of the housing main body 41, and a second electric wire drawing part 42*b* with a tubular shape protruding from an inner peripheral side of an end surface of the first electric wire drawing part 42*a* in the protruding direction and making the inner space of the first electric wire drawing part 42*a* communicate with the outside of the housing 40 (FIG. 2 to FIG. 4). In this electric wire drawing part 42, the opening in the second electric wire drawing part 42*b* on the protruding direction side is used as the electric wire drawing port 40*b*. In this connector 20, the terminal fitting 30 and the end of the electric wire 10 are inserted through the electric wire drawing port 40*b*, and the terminal fitting 30 and the end of the electric wire 10 are inserted into the housing chamber 40*a* through the electric wire drawing part 42; thus, the electric wire 10 is drawn out of the housing chamber 40*a* through the electric wire drawing port 40*b*.

The connector 20 described here is configured as a so-called shielded connector. For this reason, in this connector 20, the housing 40 is molded from a conductive material such as metal to suppress the entry of external noise into the housing chamber 40*a*, and the housing 40 is electrically connected to a metal casing of the counterpart device EP. Furthermore, in the connector-equipped electric wire 1 described here, the tip of the electric wire 10 that is drawn from the electric wire drawing port 40*b* is covered with a braided wire 16 with a tubular shape (FIG. 2 to FIG. 4). The braided wire 16 is a member made of metal wires braided into a mesh and cylindrical tubular shape, and suppresses the entry of external noise into the electric wire 10. The braided wire 16 described here is placed on an outer peripheral surface of the second electric wire drawing part 42*b* and is electrically connected to the second electric wire drawing part 42*b*.

In this connector-equipped electric wire 1, the braided wire 16 is covered with the exterior member 15 from the outside in a radial direction. This exterior member 15 is molded from an insulating material such as synthetic resin into a tubular shape, and the electric wire 10 drawn from the electric wire drawing port 40*b* is inserted into the exterior member 15 together with the braided wire 16. As a result, this exterior member 15 is placed on the electric wire 10 drawn from the electric wire drawing port 40*b* and the braided wire 16 that covers the electric wire 10. The exterior member 15 described here is molded in a cylindrical tubular shape and covers the electric wire 10 and the braided wire 16 substantially concentrically. For example, a corrugated tube with a cylindrical tubular and bellows-like shape is used as this exterior member 15.

The connector 20 has a waterproof function to protect the terminal fitting 30 from water. As described above, in the housing 40, the waterproof property of the counterpart fitting chamber 40*e* is secured by the first sealing member EP2, and the waterproof property of the communication hole 40*c* side in the housing chamber 40*a* is secured by the second sealing member 59. Therefore, in this housing 40, the first sealing member EP2 and the second sealing member 59 together form a first sealed space part 40*f* (FIG. 2 and FIG. 3) in the housing 40. This first sealed space part 40*f* is a sealed space in the housing 40 in this connector 20. This first sealed space part 40*f* is formed by the housing chamber 40*a* and the inner space of the electric wire drawing part 42. In this connector 20, the first sealed space part 40*f* can be formed in the housing 40 by further adding the waterproof function to the electric wire drawing port 40*b* side.

The connector 20 includes a waterproof member 60, which is elastically deformable, to suppress the entry of external liquid (such as water) into the electric wire drawing port 40*b* in order to add the waterproof function to the electric wire drawing port 40*b* side (FIG. 1 to FIG. 4). This waterproof member 60 includes one end part 60*a* with its inner peripheral surface in close contact with the outer peripheral surface of the end part of the housing 40 on the electric wire drawing port 40*b* side (electric wire drawing part 42), the other end part 60*b* with its inner peripheral surface in close contact with the outer peripheral side of the electric wire 10 drawn out of the electric wire drawing port 40*b*, and a tubular part 60*c* connecting between the one end part 60*a* and the other end part 60*b* (FIG. 1 to FIG. 4). This waterproof member 60 is molded from, for example, a synthetic rubber material.

The waterproof member 60 described here has a first waterproof part 61 with a cylindrical tubular shape, a second waterproof part 62 with a cylindrical tubular shape, having a smaller diameter than that of the first waterproof part 61, and a tapered part 63 with a tubular shape, connecting the first waterproof part 61 and the second waterproof part 62 on the same axis (FIG. 1 to FIG. 4).

In this waterproof member 60, an end part of the first waterproof part 61 on the opening side is used as one end part 60*a* where the inner peripheral surface is attached in close contact with the outer peripheral surface of the electric wire drawing part 42. This one end part 60*a* is placed on the first electric wire drawing part 42*a* of the electric wire drawing part 42 from the outer peripheral surface side, so that the inner peripheral surface is brought into close contact with the outer peripheral surface of the first electric wire drawing part 42*a*. In this example, this one end part 60*a* is fastened with a binding band 69 from the outer peripheral surface side to improve the adhesion between this one end part 60*a* and the first electric wire drawing part 42*a* (FIG. 1).

In this waterproof member 60, the second waterproof part 62 is used as the other end part 60*b* where the inner peripheral surface is attached in close contact with the outer peripheral side of the electric wire 10 drawn from the electric wire drawing port 40*b*. When the connector-equipped electric wire 1 includes neither the exterior member 15 nor the braided wire 16, this other end part 60*b* (second waterproof part 62) is placed on the electric wire 10 drawn from the electric wire drawing port 40*b* from the outer peripheral surface side and the inner peripheral surface is brought into close contact with the outer peripheral surface of the electric wire 10. On the other hand, since the connector-equipped electric wire 1 includes the exterior member 15 and the braided wire 16, the other end part 60*b* (second waterproof part 62) described here is placed on the exterior member 15, which covers the electric wire 10 drawn from the electric wire drawing port 40*b* from the outside, from the outer peripheral surface side, so that the inner peripheral surface is brought into close contact with the outer peripheral surface of the exterior member 15. Here, since the exterior member 15 is the corrugated tube with the bellows-like shape, the inner peripheral surface of the other end part 60*b* (second waterproof part 62) is in close contact with a plurality of ridges of this exterior member 15. In this example, this other end part 60*b* (second waterproof part 62) is fastened with the binding band 69 from the outer peripheral surface side to enhance the adhesion between this other end part 60*b* (second waterproof part 62) and the outer peripheral side of the electric wire 10 (here, the outer peripheral surfaces of the ridges of the exterior member 15) (FIG. 1).

In this waterproof member 60, the tapered part 63 and the remainder of the first waterproof part 61 excluding the one end part 60*a* are used as the tubular part 60*c*. The tubular part 60*c* includes a second sealed space part 64 that communicates with the first sealed space part 40*f* through the electric wire drawing port 40*b* (FIG. 2 and FIG. 3). For example, this tubular part 60*c* is formed so that a gap is provided between an inner peripheral surface thereof and the outer peripheral surface of the second electric wire drawing part 42*b* of the electric wire drawing part 42 (braided wire 16), and between this inner peripheral surface and the outer peripheral surface of the electric wire 10 (braided wire 16). In other words, this waterproof member 60 is formed so that an annular space part is provided between the inner peripheral surface of the tubular part 60*c* and the outer peripheral surface of the second electric wire drawing part 42*b* of the electric wire drawing part 42, and between the inner peripheral surface of the tubular part 60*c* and the outer peripheral surface of the electric wire 10. Therefore, in this waterproof member 60, the annular space part serves as the second sealed space part 64.

Thus, in this connector 20 and the connector-equipped electric wire 1, the second sealed space part 64 is provided inside the waterproof member 60. Therefore, in this connector 20 and the connector-equipped electric wire 1, if the internal pressure of the first sealed space part 40*f* of the housing 40 changes due to a change in the surrounding temperature or the like, the waterproof member 60 may expand or contract under the influence of this internal pressure change. If the waterproof member 60 expands and contracts excessively, for example, a gap may be formed between the one end part 60*a* and the first electric wire drawing part 42*a*, or between the other end part 60*b* and the outer peripheral side of the electric wire 10 (in this case, the outer peripheral surface of the exterior member 15). The excessive expansion and contraction may also cause an overload on the waterproof member 60.

In view of this, the connector 20 in this embodiment includes a ventilation component 70 that is assembled to the lid member 50 to enable the passage of gas between the first sealed space part 40*f* and the outside of the housing 40, while disabling the passage of liquid between the two (FIG. 1 to FIG. 4). This ventilation component 70 is assembled to a through-hole 50*a* of the lid member 50 (FIG. 2 to FIG. 4). This through-hole 50*a* is formed penetrating the lid main body 51 and the fitting part 52, and makes the first sealed space part 40*f* communicate with the outside of the housing 40. The through-hole 50*a* described here is formed in a cylindrical columnar shape concentric with the lid main body 51 and the fitting part 52.

Figure 5:
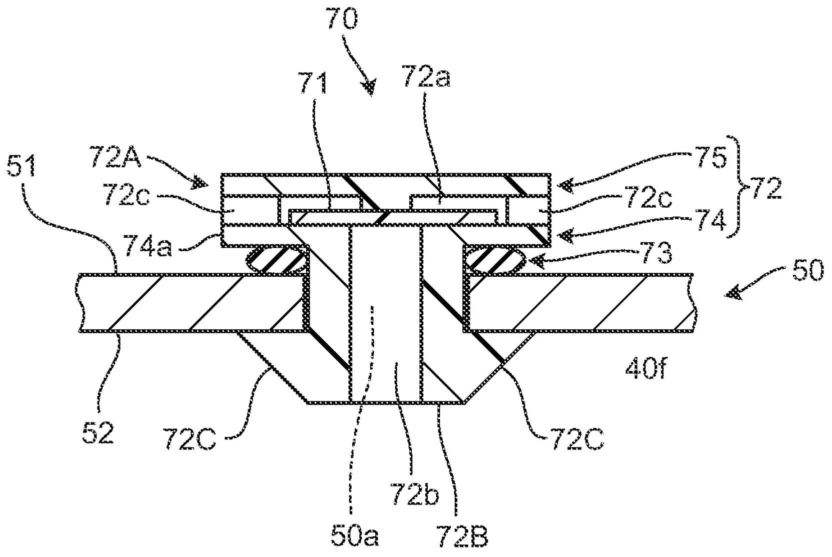
FIG. 5 is a diagram schematically illustrating a section of an example ventilation component before assembly.
Figure 6:
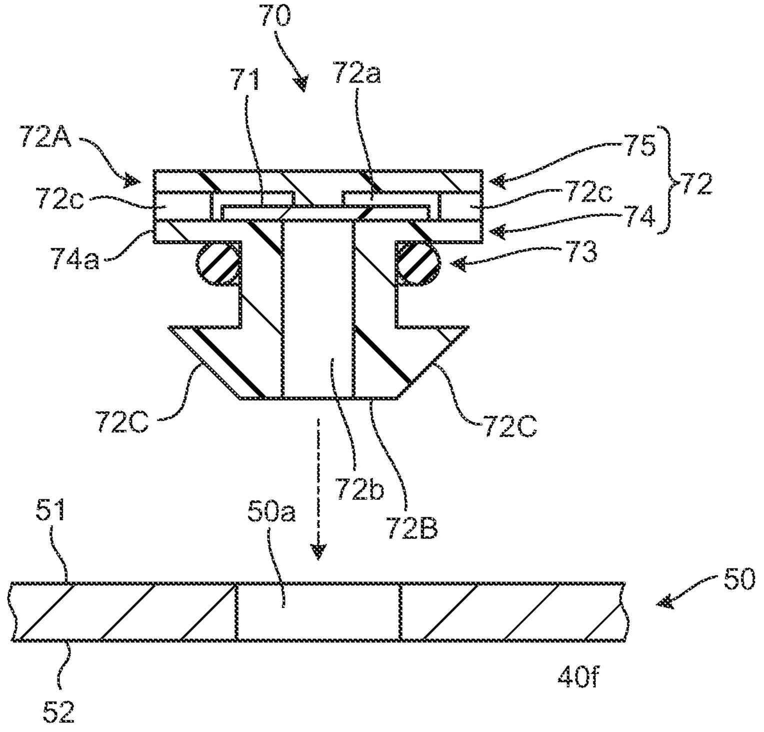
FIG. 6 is a diagram schematically illustrating the section of the example ventilation component after assembly.
Figure 7:
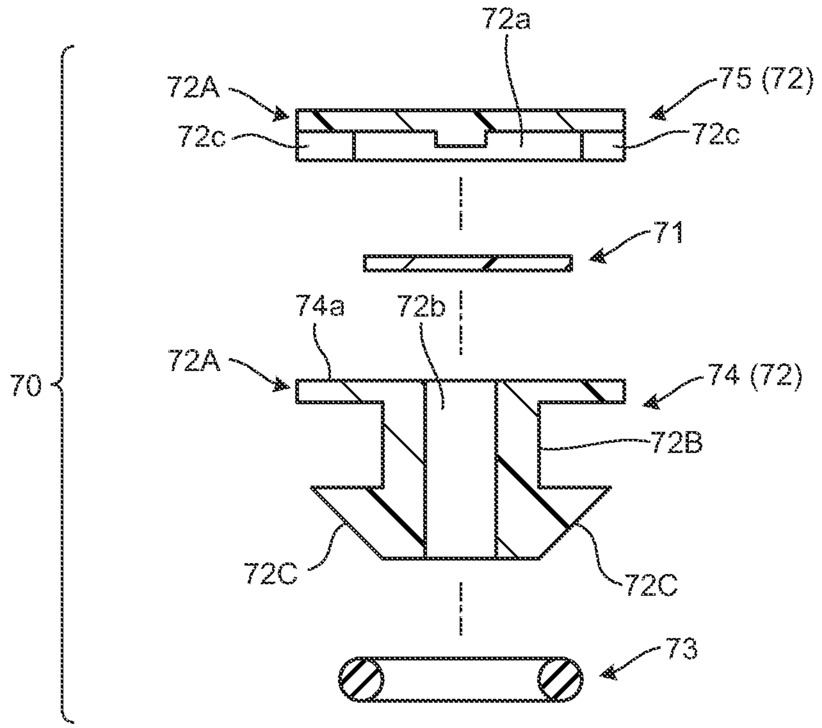
FIG. 7 is an exploded diagram schematically illustrating the section of the example ventilation component.

The ventilation component 70 includes a ventilation member 71 that allows the passage of gas but does not allow the passage of liquid, and a protective member 72 that houses and protects the ventilation member 71 (FIG. 5 to FIG. 7). Furthermore, this ventilation component 70 includes a third sealing member 73 to suppress the entry of liquid (such as water) through the through-hole 50*a* of the lid member 50.

For example, a porous member is used as the ventilation member 71. This porous member is, for example, a porous film made of polytetrafluoroethylene (PTFE). The ventilation member 71 described here is molded in a disc shape.

The protective member 72 is molded from an insulating material such as synthetic resin. The protective member 72 includes a ventilation chamber 72*a* that communicates with the first sealed space part 40*f* and the outside of the housing 40, and houses the ventilation member 71 so as to enable the passage of the gas between the first sealed space part 40*f* and the outside of the housing 40 only through the ventilation member 71 (FIG. 5 and FIG. 6). The protective member 72 includes a first communication part 72*b* that makes the ventilation chamber 72*a* communicate with the first sealed space part 40*f*, and a second communication part 72*c* that makes the ventilation chamber 72*a* communicate with the outside of the housing 40 (FIG. 5 and FIG. 6).

For example, this protective member 72 includes a main part 72A including the ventilation chamber 72*a*, a shaft part 72B that protrudes from the main part 72A and is inserted into the through-hole 50*a* of the lid member 50, and a fixing part 72C that is fixed to the lid member 50 (FIG. 5 to FIG. 7). The first communication part 72*b* is formed, for example, as a passage from the main part 72A to the shaft part 72B. The second communication part 72*c* is formed, for example, as a passage or an opening in the main part 72A. The third sealing member 73 is molded into an annular shape that allows the shaft part 72B to be inserted thereinto. The third sealing member 73 is disposed between the main part 72A and an outer wall surface of the lid main body 51 of the lid member 50 in close contact with the main part 72A and this outer wall surface, thereby suppressing the entry of liquid through the through-hole 50*a* of the lid member 50.

Specifically, the protective member 72 described here is an assembly of a first protective member 74 and a second protective member 75, and the main part 72A is divided into the first protective member 74 side and the second protective member 75 side (FIG. 5 to FIG. 7). The first protective member 74 and the second protective member 75 may be held in a manner that, for example, these members are assembled together with a lock mechanism such as a claw (not illustrated) or they may be attached together with an adhesive.

The first protective member 74 includes a pedestal part 74*a* with a plate shape, which is one division of the main part 72A, the shaft part 72B with a cantilever shape, which is suspended from the pedestal part 74*a*, and a plurality of fixing parts 72C with a claw shape, which protrude from an outer peripheral surface of a free end of the shaft part 72B (FIG. 5 to FIG. 7). This first protective member 74 includes the first communication part 72*b*.

In this first protective member 74, the pedestal part 74*a* is formed in a ring plate shape and the shaft part 72B is formed in a cylindrical tubular shape coaxial with the pedestal part 74*a*. In this first protective member 74, the inner space of each of the pedestal part 74*a* and the shaft part 72B is used as the first communication part 72*b* with a cylindrical columnar shape.

The fixing parts 72C are locking parts to be locked to an inner wall surface of the fitting part 52 of the lid member 50 in the first sealed space part 40*f*. This fixing parts 72C are inserted into the first sealed space part 40*f* and locked to the periphery of the through-hole 50*a* on the inner wall surface of the fitting part 52.

The ventilation member 71 is attached to the pedestal part 74*a* in a state where the opening of the first communication part 72*b* on the pedestal part 74*a* side is closed. For example, this ventilation member 71 may be welded to the pedestal part 74*a*, or may be attached to this pedestal part 74*a* with an adhesive.

The second protective member 75 is the other division of the main part 72A. This second protective member 75 includes a space part as the ventilation chamber 72*a* that houses the ventilation member 71 attached to the pedestal part 74*a*. The second protective member 75 includes the second communication part 72*c*.

This second protective member 75 is formed in a cylindrical tubular shape with the opening at one end closed, and at least one groove part forming the second communication part 72*c* is formed in its peripheral wall.

As described above, in the connector 20 and the connector-equipped electric wire 1 in the present embodiment, when the internal pressure of the first sealed space part 40*f* of the housing 40 changes, such as a change in the surrounding temperature, the change in the internal pressure can be suppressed by the ventilation component 70. Therefore, in the connector 20 and the connector-equipped electric wire 1, the expansion and contraction of the waterproof member 60 can be suppressed, so that the one end part 60*a* and the first electric wire drawing part 42*a* can be kept in a close contact state and the other end part 60*b* and the outer peripheral side of the electric wire 10 (here, the outer peripheral surface of the exterior member 15) can be kept in a close contact state. In the connector 20 and the connector-equipped electric wire 1, by suppressing the expansion and contraction of the waterproof member 60, the overload is not applied on the waterproof member 60. Therefore, in the connector 20 and the connector-equipped electric wire 1 in the present embodiment, the waterproof member 60 can keep the waterproof function and the waterproof property can be improved. In addition to this, the connector 20 and the connector-equipped electric wire 1 in this embodiment can secure the waterproof property without having the waterproof function such as a sealing member between the electric wire 10 and the housing 40; thus, the size can be reduced.

In addition, the connector 20 and the connector-equipped electric wire 1 in this embodiment have the braided wire 16 in the space surrounded by the housing 40, the waterproof member 60, and the exterior member 15, and thus the braided wire 16 can also have the waterproof function.

In addition, in the connector 20 and the connector-equipped electric wire 1 in this embodiment, the housing 40 may be made in the shape that matches the shape of the connector of the counterpart device EP (for example, the shape of the counterpart terminal fitting EP1), and in this case, since the ventilation component 70 is assembled to the lid member 50, the lid member 50 and the ventilation component 70 can have versatility without being affected by the shape of the housing 40.

In addition, the connector 20 and the connector-equipped electric wire 1 in this embodiment have the ventilation component 70 assembled to the lid member 50, which is highly rigid and easy to secure a flat surface, instead of the flexible waterproof member 60, and accordingly, the ventilation component 70 can be assembled easily.

In addition, the connector 20 and the connector-equipped electric wire 1 in this embodiment can have the ventilation component 70 pre-assembled to the connector 20, so that the ventilation component 70 does not particularly interfere with the work of assembling the connector 20 to the counterpart.

Incidentally, in the connector-equipped electric wire 1 in this embodiment, the housing chambers 40*a* of both connectors 20 are connected through the exterior member 15; therefore, simply providing the ventilation component 70 only to one connector 20 can suppress the change in the internal pressure of the first sealed space part 40*f* in each housing chamber 40*a*. Therefore, the connector-equipped electric wire 1 in this embodiment can have the effect similar to the aforementioned effect even if the ventilation component 70 is provided only to one connector 20. In this case, the lid member 50 to which the ventilation component 70 can be assembled may be prepared for one connector 20, and a lid member without the through-hole 50*a* (not illustrated) may be prepared for the other connector 20. As a result, in the connector-equipped electric wire 1 in this embodiment, since there is no need to change the shape of the housing 40 depending on the presence or absence of the ventilation component 70, the cost can be reduced.

Figure 8:
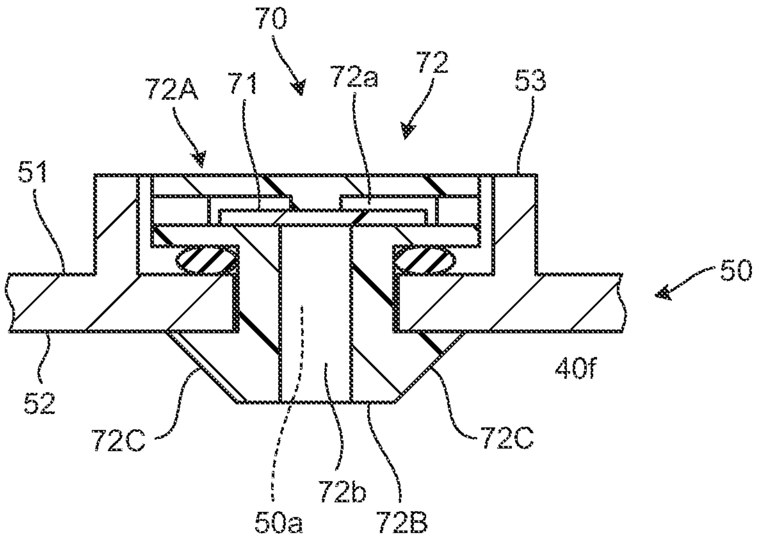
FIG. 8 is a diagram schematically illustrating the section of the example ventilation component after assembly, together with a tubular protective wall.

In the connector 20 and the connector-equipped electric wire 1, the protecting function of the ventilation member 71 may be enhanced by providing a tubular protective wall 53, which surrounds the periphery of the main part 72A of the protective member 72, to the lid main body 51 of the lid member 50 (FIG. 8).

Figure 9:
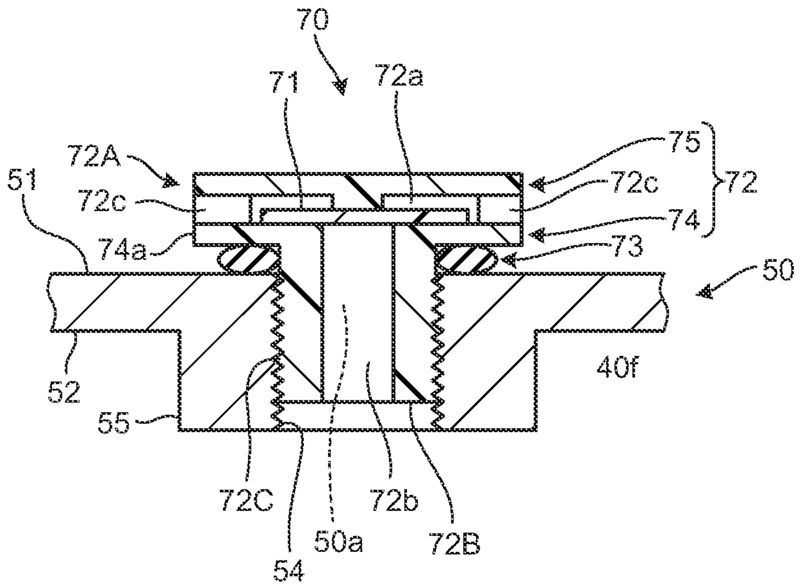
FIG. 9 is a diagram schematically illustrating a section of a ventilation component according to a modification after assembly.

In the connector 20 and the connector-equipped electric wire 1, a male screw part provided on the outer peripheral surface of the shaft part 72B may be used as the fixing part 72C, and the ventilation component 70 may be assembled to the lid member 50 by screwing the fixing part 72C to at least a female screw part 54 provided on the peripheral wall surface of the through-hole 50*a* of the lid member 50 (FIG. 9). Here, in order to secure the axial force between the fixing part 72C, which is the male screw part, and the female screw part 54, a fixing part 55 with a cylindrical tubular shape is provided on the inner wall surface of the fitting part 52 of the lid member 50, and the female screw part 54 is extended to the inner peripheral surface of this fixing part 55 (FIG. 9).

In the connector and the connector-equipped electric wire according to the present embodiment, when the internal pressure of the housing chamber of the housing changes, such as a change in the surrounding temperature, the change in the internal pressure can be suppressed by a ventilation component. Therefore, in the connector and the connector-equipped electric wire, the expansion and contraction of the waterproof member can be suppressed, so that one end part and the end part of the housing on the electric wire drawing port side can be kept in a close contact state, and moreover, the other end part and the outer peripheral side of the electric wire can be kept in a close contact state. In the connector and the connector-equipped electric wire, by suppressing the expansion and contraction of the waterproof member, the overload is not applied on the waterproof member. Therefore, in the connector and the connector-equipped electric wire according to the present invention, the waterproof member can keep the waterproof function and the waterproof property can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting physically and electrically connected to an end of an electric wire;

a housing including a housing chamber for housing the terminal fitting and the end of the electric wire connected to the terminal fitting, an electric wire drawing port through which the electric wire is drawn to outside of the housing chamber, a communication hole through which the housing chamber communicates with the outside of the housing chamber, and a counterpart fitting chamber into which a counterpart terminal fitting to be physically and electrically connected to the terminal fitting in the housing chamber is inserted and fitted and a gap formed between the counterpart fitting chamber and an outer peripheral surface of the counterpart terminal fitting is filled with a first sealing member;

a lid member that covers the communication hole;

a second sealing member that fills a gap between the lid member and the communication hole and forms a first sealed space part in the housing with the first sealing member;

a waterproof member being elastically deformable and including one end part with an inner peripheral surface in close contact with an outer peripheral surface of an end part of the housing on the electric wire drawing port side, an other end part with an inner peripheral surface in close contact with an outer peripheral side of the electric wire drawn from the electric wire drawing port, and a tubular part connecting between the one end part and the other end part, the tubular part including a second sealed space part communicating with the first sealed space part through the electric wire drawing port; and a ventilation component that is assembled to the lid member, enables passage of gas between the first sealed space part and the outside of the housing, and disables passage of liquid between the first sealed space part and the outside of the housing.

2. The connector according to claim 1, wherein the terminal fitting is screwed and fixed to the counterpart terminal fitting, and the communication hole is used as an opening for work when the terminal fitting is screwed and fixed to the counterpart terminal fitting.

3. The connector according to claim 1, wherein the ventilation component includes a ventilation member that enables the passage of the gas and disables the passage of the liquid, and a protective member that houses and protects the ventilation member, and the protective member includes a ventilation chamber that communicates with the first sealed space part and the outside of the housing, and houses the ventilation member so as to enable the passage of the gas between the first sealed space part and the outside of the housing only through the ventilation member.

4. The connector according to claim 3, wherein the terminal fitting is screwed and fixed to the counterpart terminal fitting, and the communication hole is used as an opening for work when the terminal fitting is screwed and fixed to the counterpart terminal fitting.

5. The connector according to claim 3, wherein the lid member includes a through-hole that makes the first sealed space part communicate with the outside of the housing, the protective member includes a main part including the ventilation chamber, a shaft part that protrudes from the main part and is inserted into the through-hole, and a fixing part that is fixed to the lid member, and the ventilation component includes a third sealing member with an annular shape that allows the shaft part to be inserted into the third sealing member, and that is disposed between the main part and an outer wall surface of the lid member in close contact with the main part and the outer wall surface of the lid member.

6. The connector according to claim 5, wherein the terminal fitting is screwed and fixed to the counterpart terminal fitting, and the communication hole is used as an opening for work when the terminal fitting is screwed and fixed to the counterpart terminal fitting.

7. A connector-equipped electric wire comprising:

an electric wire; and a connector attached to an end of the electric wire, the connector including a terminal fitting physically and electrically connected to the end of the electric wire, a housing including a housing chamber for housing the terminal fitting and the end of the electric wire connected to the terminal fitting, an electric wire drawing port through which the electric wire is drawn to outside of the housing chamber, a communication hole through which the housing chamber communicates with the outside of the housing chamber, and a counterpart fitting chamber into which a counterpart terminal fitting to be physically and electrically connected to the terminal fitting in the housing chamber is inserted and fitted and a gap formed between the counterpart fitting chamber and an outer peripheral surface of the counterpart terminal fitting is filled with a first sealing member, a lid member that covers the communication hole, a second sealing member that fills a gap between the lid member and the communication hole and forms a first sealed space part in the housing with the first sealing member, a waterproof member being elastically deformable and including one end part with an inner peripheral surface in close contact with an outer peripheral surface of an end part of the housing on the electric wire drawing port side, an other end part with an inner peripheral surface in close contact with an outer peripheral side of the electric wire drawn from the electric wire drawing port, and a tubular part connecting between the one end part and the other end part, the tubular part including a second sealed space part communicating with the first sealed space part through the electric wire drawing port, and a ventilation component that is assembled to the lid member, enables passage of gas between the first sealed space part and the outside of the housing, and disables passage of liquid between the first sealed space part and the outside of the housing.

8. The connector-equipped electric wire according to claim 7, wherein the connector is attached to each of one end and the other end of the electric wire.

9. The connector-equipped electric wire according to claim 7, further comprising:

an exterior member with a tubular shape that is placed on the electric wire drawn through the electric wire drawing port, wherein the waterproof member has an inner peripheral surface of the other end part in close contact with an outer peripheral surface of the exterior member.

10. The connector-equipped electric wire according to claim 9, wherein the connector is attached to each of one end and the other end of the electric wire.

* * * * *